May 13, 1958 C. M. PERKINS, SR., ET AL 2,834,564
ORIENTATION CONTROL
Filed Sept. 19, 1947 6 Sheets-Sheet 2
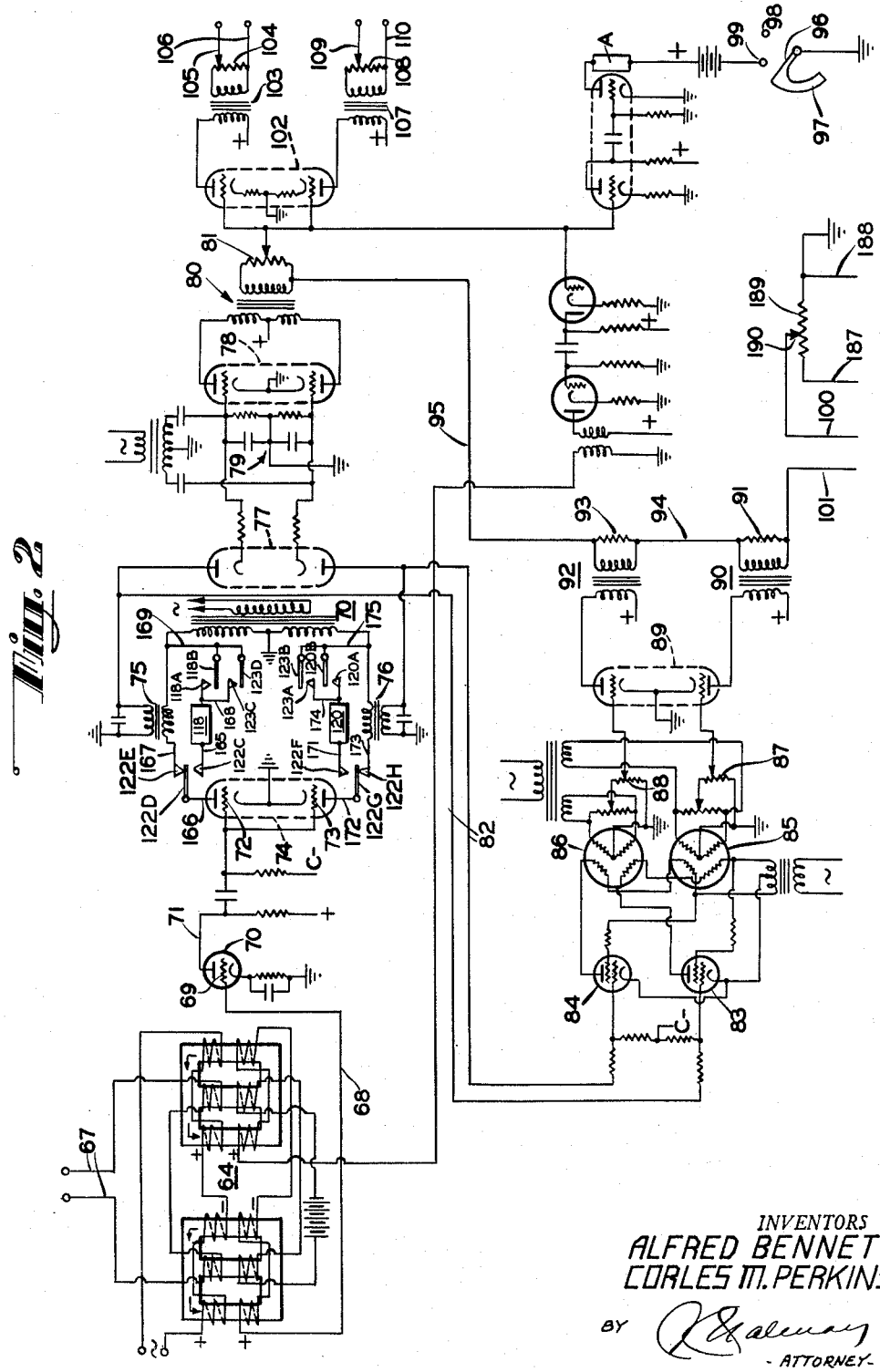
Fig. 2
INVENTORS
ALFRED BENNETT
CORLES M. PERKINS
BY
- ATTORNEY -

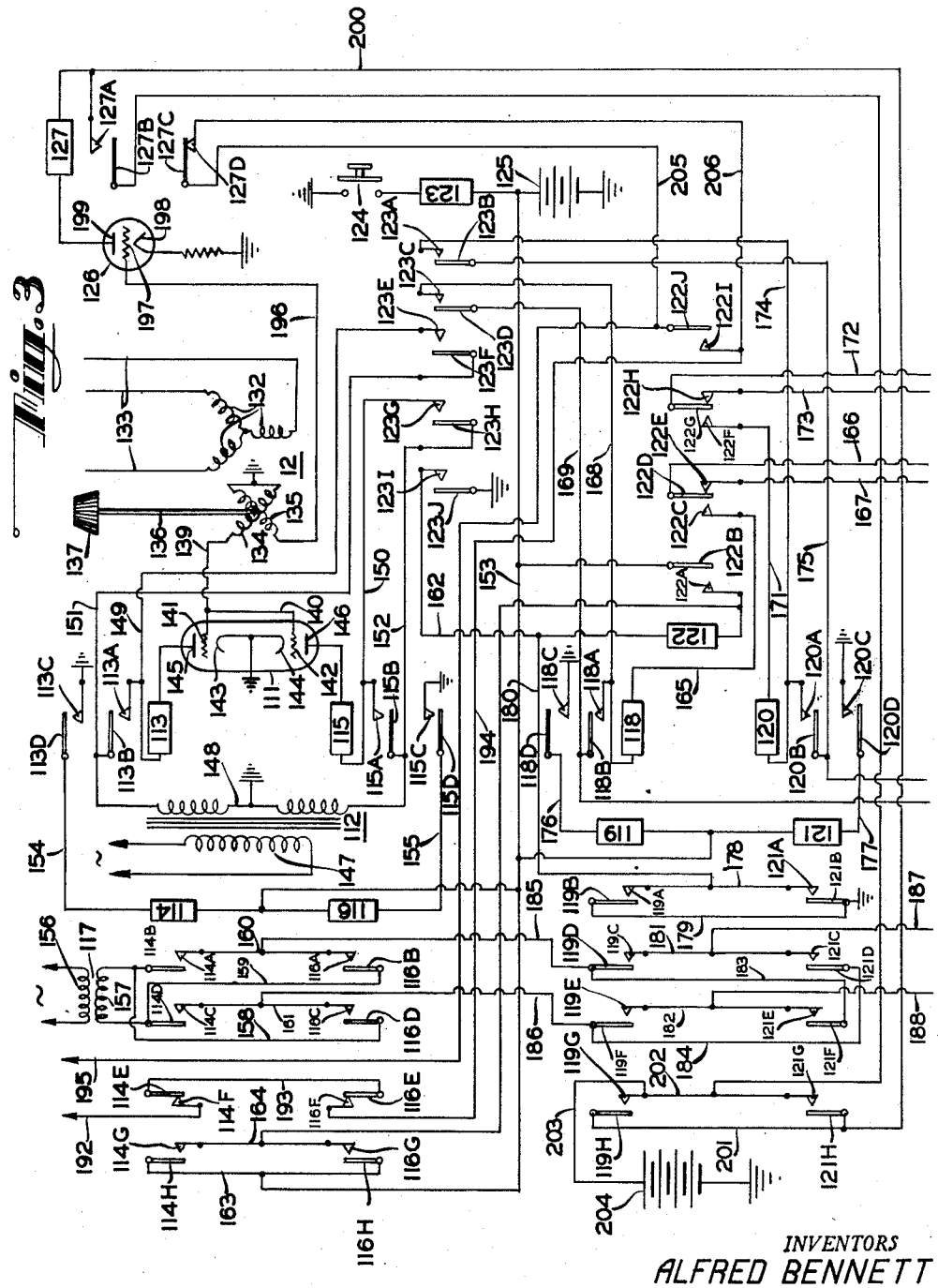

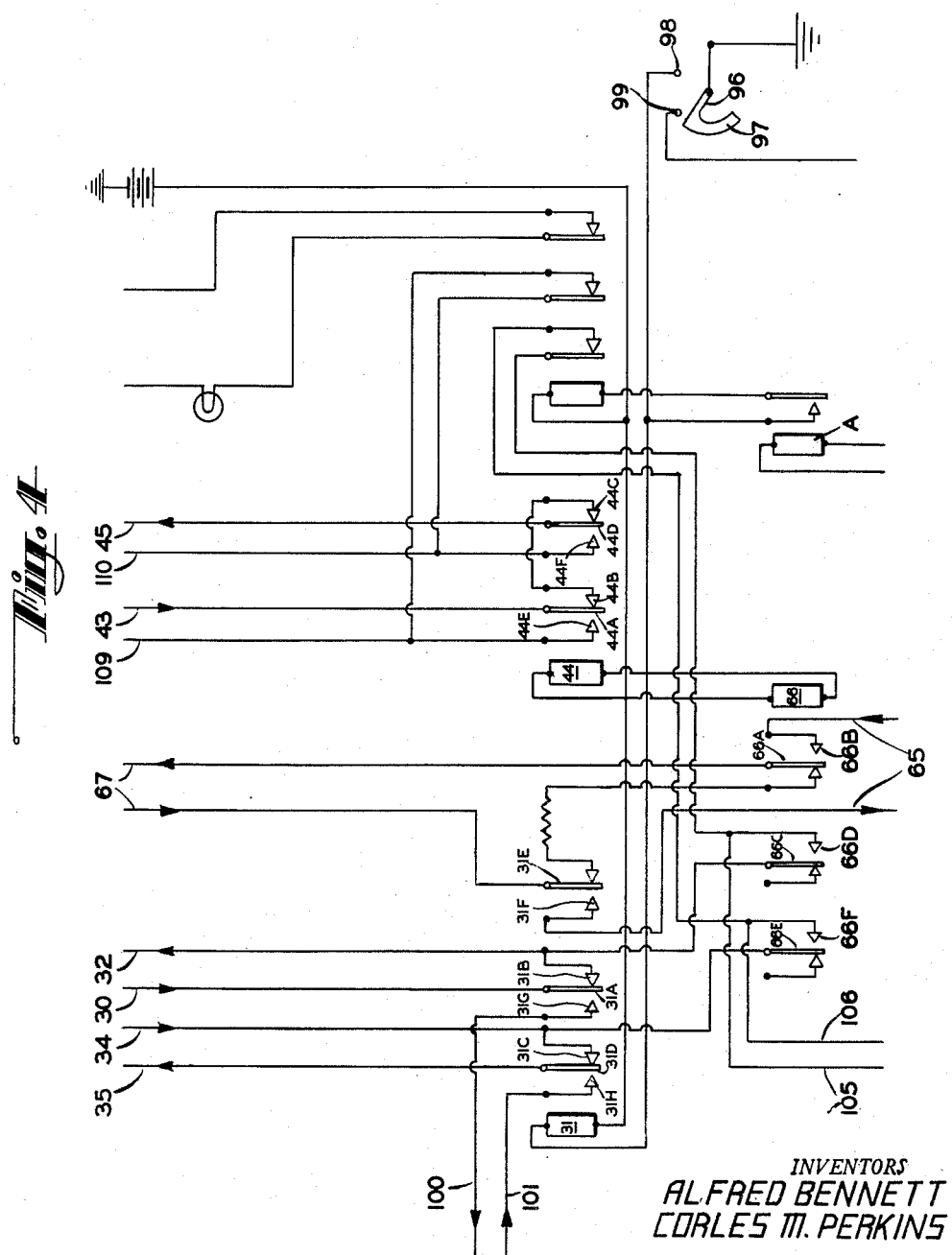

May 13, 1958    C. M. PERKINS, SR., ET AL    2,834,564
ORIENTATION CONTROL
Filed Sept. 19, 1947          6 Sheets-Sheet 5
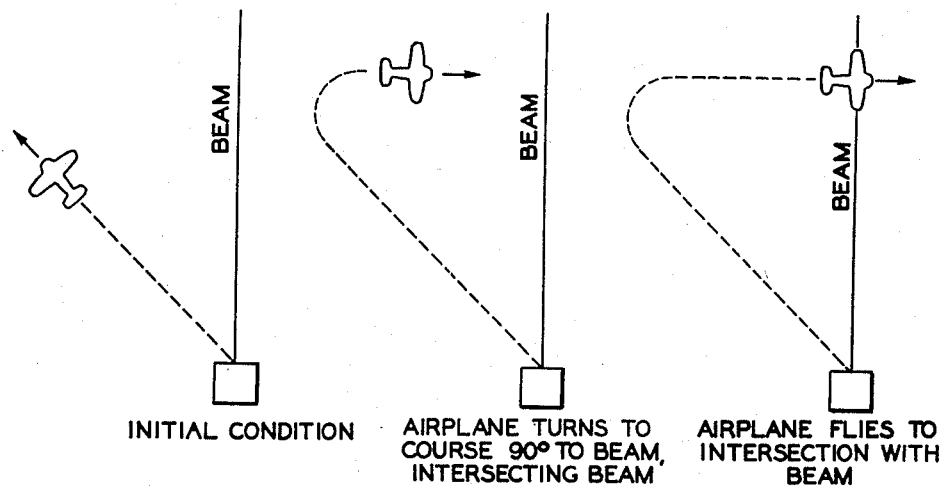
Fig. 5 — INITIAL CONDITION
Fig. 6 — AIRPLANE TURNS TO COURSE 90° TO BEAM, INTERSECTING BEAM
Fig. 7 — AIRPLANE FLIES TO INTERSECTION WITH BEAM
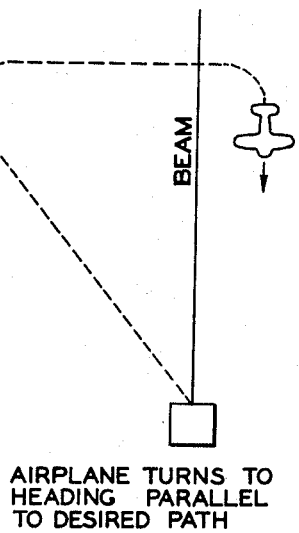
Fig. 8 — AIRPLANE TURNS TO HEADING PARALLEL TO DESIRED PATH
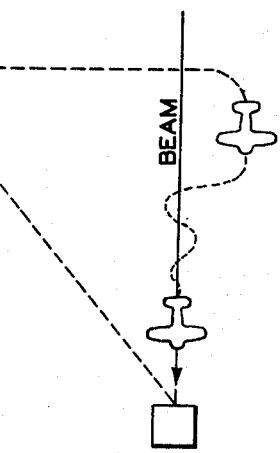
Fig. 9 — CONTROL IS TURNED OVER TO AUTOMATIC APPROACH CONTROL
INVENTORS
ALFRED BENNETT
CORLES M. PERKINS
BY ATTORNEY

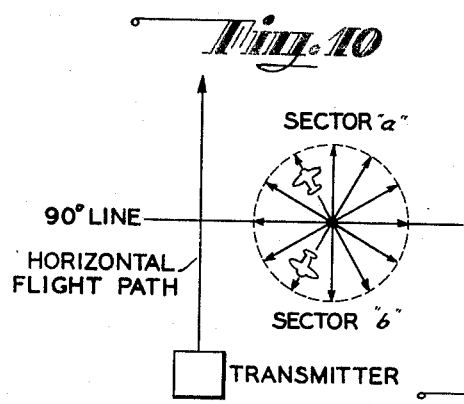
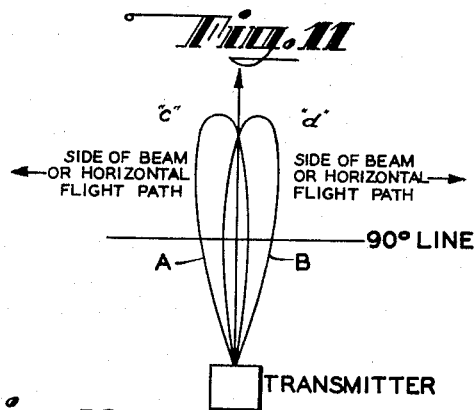
| SECTOR | BEAM SIDE | TURN | FIGURE |
|---|---|---|---|
| $a$ | $c$ | R | 13 |
| $a$ | $d$ | L | 14 |
| $b$ | $c$ | L | 15 |
| $b$ | $d$ | R | 16 |
Fig. 12
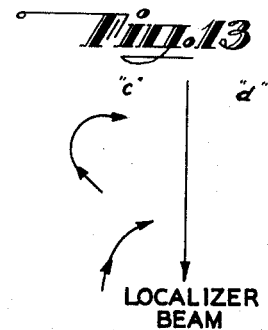
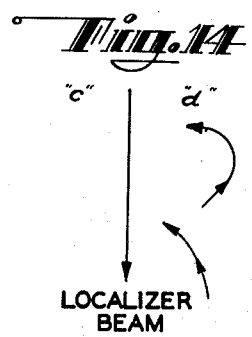
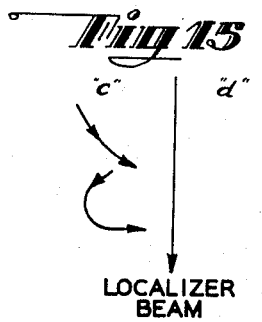
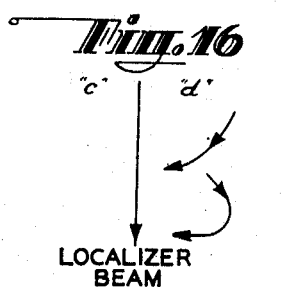

United States Patent Office

2,834,564
Patented May 13, 1958

2,834,564

ORIENTATION CONTROL

Corles Melvin Perkins, Sr., Rutherford, N. J., and Alfred Bennett, Bronx, N. Y., assignors to Bendix Aviation Corporation, Teterboro, N. J., a corporation of Delaware Application September 19, 1947, Serial No. 774,956

33 Claims. (Cl. 244—77)

The present invention relates generally to the automatic steering of mobile craft by the use of automatic radio approach control systems of the character shown in pending application Serial No. 705,524, filed October 25, 1946, and now U. S. Patent No. 2,592,173, issued April 8, 1952, and more particularly to a novel method of and apparatus for automatically orientating a craft provided with an automatic approach system to direct it toward the vicinity of the beam or beams to be followed by the craft.

The automatic approach control system disclosed in the aforementioned pending application is designed to operate with conventional localizer and glide path transmitters located at an airport to which an aircraft, provided with an automatic pilot, is heading so as to automatically guide the craft through the automatic pilot in both horizontal and vertical planes. However, unless the heading of the craft makes an angle, no greater than ten degrees (10°) with the beam to be followed, the automatic approach control system, when engaged, will not operate as intended but will instead develop instability of control subjecting the craft to undesirable oscillations about the beam or beams.

In order, therefore, that the automatic approach control system function as intended without the aforementioned disadvantage, it is desirable that the system is not engaged until the craft is brought onto a heading in the direction of the localizer and glide path transmitters and at an angle no greater than ten degrees with the radio beam or beams.

An object of the present invention, therefore, is to provide a novel automatic steering system for mobile craft.

Another object of the present invention is to provide a novel automatic steering system for mobile craft to desirably direct the craft along a radio beam or beams emanating from a given destination.

A further object of the invention is to provide a novel arrangement for automatically orientating a craft provided with an automatic approach control system to a desired position and direction relative to a radio beam or beams to be followed, the automatic approach control coming into operation to steer the craft after the latter has attained the desired position and direction.

Another object is to provide a novel method of and apparatus for automatically orientating an aircraft, provided with automatic pilot and automatic radio approach control systems, in a horizontal plane to direct the craft toward a horizontal flight path beam to be followed, which emanates from a radio transmitter located at a desired landing field, so that as the beam is reached the automatic approach system will assume control of the craft to direct it along the beam toward the radio beam transmitter.

A further object is to provide a novel orientation control system for an aircraft, having an automatic pilot and an automatic approach system thereon, which will take over control of the craft at some point within the pattern of a localizer radio beam and cause the craft to turn to and thereafter maintain a heading of ninety degrees to the beam until intersection is made with the beam whereupon the automatic approach system is engaged to control the craft to turn again to an inbound heading for the remainder of the flight toward the beam transmitter, the orientation control becoming ineffective, when an inbound heading is attained.

Another object is to provide a novel orientator for an aircraft, having an automatic pilot and automatic approach system thereon, which automatically assumes control of the craft on any heading within the pattern of a desired radio beam and inserts appropriate turn signals into the automatic pilot to maneuver the craft onto an inbound heading in parallel with the beam thereby enabling the automatic approach control system to bring the craft onto the localizer beam.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustrative purposes only, and are not to be construed as defining the limits of the invention.

In the drawings, wherein like reference characters refer to like parts,

Figure 2 is a schematic wiring diagram of the horizontal flight path computer of an automatic approach control system together with its connection with the novel orientation of the present invention;

Figure 3 is a wiring diagram of the novel orientator of the present invention;

Figure 4 is a wiring diagram of the relay control system of the horizontal flight path computer of the automatic approach control system;

Figure 1:
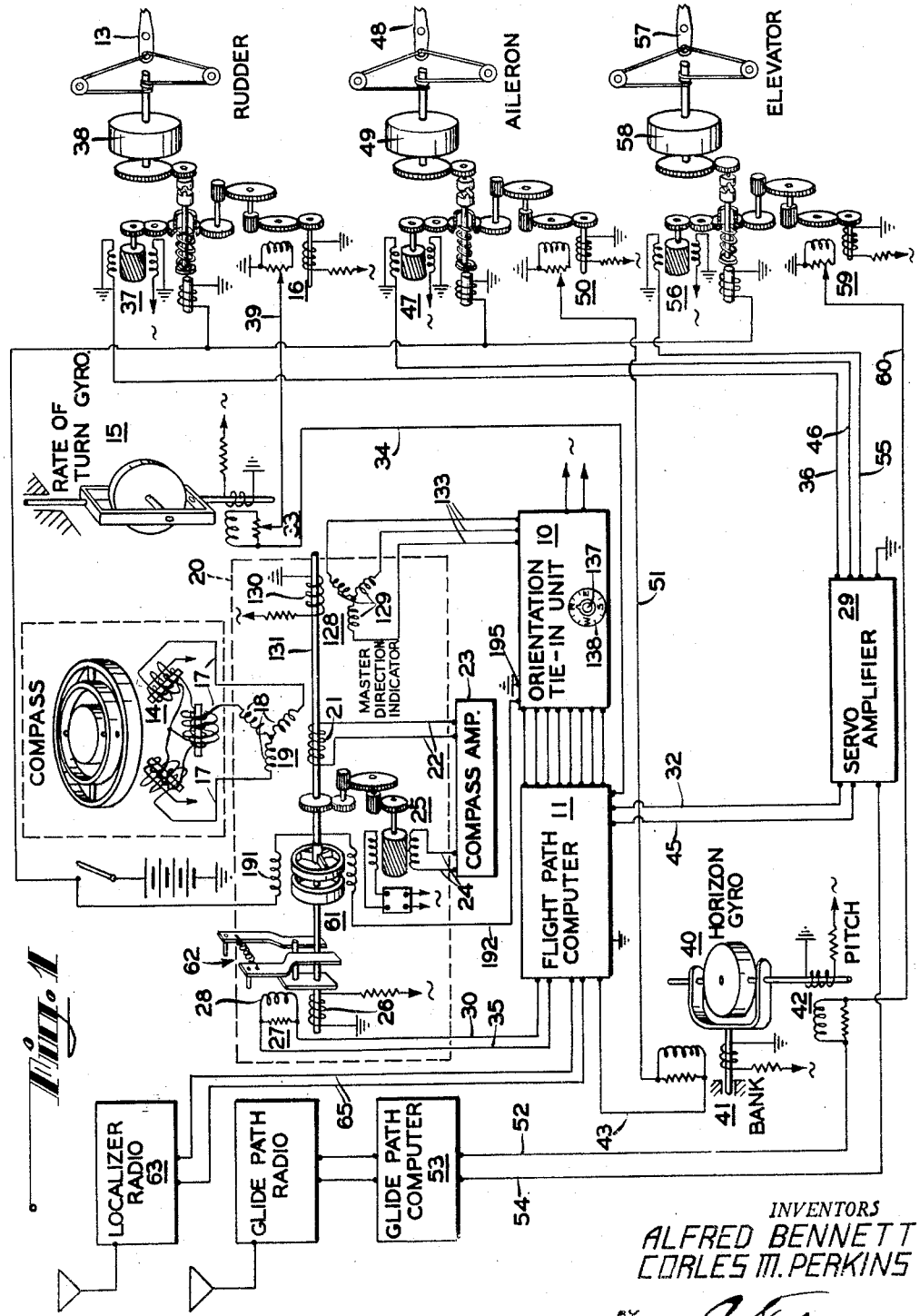
Figure 1 is a block diagram illustrating the novel orientator of the present invention and its association with an aircraft automatic pilot and an automatic approach control system.

Figures 5 to 9, inclusive, are graphic illustrations representing a typical craft flight path under the control of the novel orientator of the present invention in conjunction with the horizontal flight path computer of the automatic approach control system; and, Figures 10 to 16, inclusive, are graphic illustrations of the direction of turns required of an air craft having different headings on either side of the horizontal flight path when the novel orientator thereof assumes control.

Generally considered, for a better understanding of the entire control system, the novel orientator unit 10 of the present invention, operating in conjunction with a localizer flight path computer 11 of an automatic approach control system assumes control of an aircraft through an automatic pilot carried thereby, regardless of the heading of the craft, at any point within the pattern of the localizer beam, see Figure 5 of the drawings, for example, disengages the direction displacement or compass control normally operating the automatic pilot and inserts into the latter a turn signal to cause the craft to turn from its initial heading to a heading of ninety degrees (90°) to the localizer beam, in a direction such as to ultimately intersect the beam. When, as a result of the turn signal introduced into the automatic pilot by the novel orientator unit of the present invention, the craft has attained a heading of ninety degrees (90°) to the localizer beam, see Figure 6 of the drawings, for example, the orientator unit automatically terminates the turn signal and re-establishes control of the automatic pilot by the direction displacement or compass control to maintain the craft on the new heading until the craft intersects the beam.

Upon craft intersection with the localizer beam, as shown in Figure 7 of the drawings, the novel orientator hereof automatically disengages the direction displacement or compass control and engages flight path computer 11 with the automatic pilot to insert into the latter a turn signal from the computer to cause the craft to turn onto an inbound heading with the beam. When the craft has attained, thereafter, a heading parallel with the localizer beam as shown in Figure 8 of the drawings, the control effected by the orientator unit is terminated automatically and the direction displacement or compass control is re-established to place the craft under the sole operation of the automatic approach control system whereupon the craft is brought on to the beam as shown in Figure 9 of the drawings.

Use of the novel orientator unit hereof, requires a knowledge of the heading of the localizer beam to be followed with reference to compass North. This heading may be readily obtained from standard aeronautical charts and set manually into a course setter mechanism 12, see Figure 3, which constitutes a component of the orientator unit, such setting defining orientation of the craft with reference to the localizer beam. The first function of the orientator unit is to determine the direction of turn required in order that the beam may be intersected by the shortest possible turn. The required direction of turn is determined by two factors, i. e., the side of the localizer beam that the craft is on and whether the craft is flying in a semi-circle of direction located above or below a line at ninety degrees (90°) to the beam.

As will be observed by reference to Figure 10 of the drawings, an aircraft having a heading whose direction lies within a sector "a" above a line A drawn at ninety degrees (90°) to the localizer beam is within one semi-circle of direction, while a craft having a heading whose direction lies within a sector "b" below line A is within another semi-circle of direction. Referring now to Figure 13 of the drawings, if a craft is flying on the left or "c" side of the localizer beam and in a direction lying in the upper semi-circle of direction (sector "a") the shortest turn that the craft can make to attain an intersection with the beam is a turn to the right. On the other hand, if a craft is flying in the same semi-circle of direction but on the right or "d" side of the localizer beam, as shown in Figure 14 of the drawings, the shortest turn to intersect the beam will be a turn to the left. Similarly, with an aircraft flying on the "c" side of the localizer beam and in a direction lying in the lower semi-circle of direction (sector "b") the shortest turn would be to the left as shown in Figure 15. On the other hand, if the craft is flying on the "d" side of the beam and lying in the lower semi-circle of direction, as shown in Figure 16, the shortest turn will be one to the right. In Figure 12, the above facts are summarized conveniently in the form of a table.

Referring now to Figure 1 of the drawings for a more detailed description of the present invention, the novel orientator unit 10 thereof for carrying out the above described maneuvers to bring a craft on an inbound heading relative to a desired radio beam, is there shown in its connection and association with an all electric automatic pilot providing three axes of control of the character described and claimed in pending application Serial No. 516,488, filed December 31, 1943, and now U. S. Patent No. 2,625,348, issued January 13, 1953, and an automatic approach control system of the character described and claimed in pending application Serial No. 705,524, filed October 25, 1946, and now U. S. Patent No. 2,592,173, issued on April 8, 1952.

As better shown in aforementioned pending application Serial No. 516,488, and now U. S. Patent No. 2,625,348, the control of a rudder 13, Figure 1, is derived from a gyro-stabilized earth inductor type compass 14, a rate of turn gyro 15 and a follow-up device 16. Compass 14 develops a signal proportional to the amount of angular displacement of the craft from a prescribed heading which is fed by means of leads 17 to a stator winding 18 of an inductor device 19, located within a master direction indicator 20, to induce within a rotor winding 21 of the device a direction displacement signal potential that is applied by means of leads 22 to the input of a vacuum tube amplifier 23. The output of the amplifier 23 by way of leads 24 energizes a motor 25 within the master direction indicator which not only operates to drive rotor winding 21 to a new null position relative to its stator winding but also to angularly displace a rotor winding 26 of an inductive signal transmitter device 27 to reproduce the directional displacement signal potential within a stator winding 28 of the latter device, such signal potential being communicated to the input of the rudder channel of a servo amplifier 29 by way of a lead 30, an armature 31A (Figure 4) which normally engages a fixed contact 31B of a relay 31, located within flight path computer 11, and a lead 32 (Figure 1) which connects with contact 31B.

Also fed into the input of the rudder channel of servo amplifier 29, in series with the direction displacement signal, is a rate of turn signal which is developed, during a craft turn from a prescribed course, by rate of turn gyro 15 and its associated inductive take-off device 33, the latter being connected in series with stator winding 28 of inductive signal transmitter device 27 by way of a lead 34, a fixed contact 31C (Figure 4) which normally engages with an armature 31D of relay 31 and a lead 35 which connects with the armature 31D.

The output of the rudder channel of servo amplifier 29 by means of a lead 36 energizes a rudder servo motor 37 which, upon energization, displaces rudder 13 through a speed reduction gear system 38 to return the craft to its prescribed course and at the same time actuates inductive follow-up device 16 which develops an electrical follow-up signal that is fed into the input of the rudder channel of amplifier 29 in series with the direction displacement and rate of turn signals by means of a lead 39 which connects with inductive take-off device 33.

For craft attitude control, a gyro horizon 40 is provided having bank and pitch take-off devices 41 and 42, respectively, the former having an electrical signal developed therein in response to craft bank which is fed into the input of the aileron channel of amplifier 29 by way of a lead 43 which connects with an armature 44A normally engaging a fixed contact 44B which is interconnected with a fixed contact 44C normally engaged by an armature 44D of a relay 44 (Figure 4), located within flight path computer 11, and a lead 45 which connects with armature 44D. The output of the aileron channel of amplifier 29 by means of a lead 46 energizes an aileron servo motor 47 which, upon energization, displaces an aileron surface 48 through a speed reduction gear system 49 to re-establish level craft attitude and at the same time operates an inductive follow-up device 50 which develops an electrical follow-up signal that is fed into the input of the aileron channel of amplifier 29 in series with the bank signal by means of a lead 51.

Pitch take-off 42, on the other hand, has an electrical signal developed therein in response to a craft climb or dive which is fed by way of a lead 52, a glide path computer unit 53 and a lead 54 to the input of the elevator channel of amplifier 29, in a manner more fully shown in the above referred to copending application Serial No. 705,524 and now U. S. Patent No. 2,592,173. The output of the elevator channel of the amplifier by way of a lead 55 energizes an elevator servo motor 56 which, upon energization, displaces an elevator surface 57 through a speed reduction system 58 to re-establish level craft attitude and at the same time operates an inductive follow-up device 59 which develops an electrical follow-up signal that is fed into the input of the elevator channel of amplifier 29 in series with the pitch signal of take-off device 42 by way of a lead 60.

An aircraft turn may be produced through the automatic pilot by the use of a manual turn control unit similar to that described and claimed in copending application Serial No. 604,861, filed July 13, 1945, and now U. S. Patent No. 2,516,641, issued July 25, 1950, and/or automatically from orientator unit 10, in a manner to be more fully described hereinafter, by feeding into the input of the rudder channel of servo amplifier 29 in series with compass signal transmitter 27, rate of turn take-off 33 and follow-up device 16, an independent source of potential having the proper magnitude and phase relationship. The orientator, as will presently appear, is so designed that upon the introduction therefrom of a turn signal into the automatic pilot, an electro-magnetic operated clutch 61 located within master direction indicator 20 is de-energized and transmitter 27 is centered by way of a spring centering device 62 whereby the displacement signal from compass 14 is disengaged from the automatic pilot to cause the craft to turn at a rate controlled by rate gyro 15. Such craft turn will continue at its impressed rate until the turn signal from unit 10 is terminated, at which time clutch 61 is energized to engage the direction displacement signal of the compass with the rudder channel of the automatic pilot to maintain the craft on its new course or heading.

Simultaneously with the craft turn impressed by unit 10, a craft bank is also produced by feeding into the input of the aileron channel of amplifier 29, in series with bank take-off 41 and follow-up device 50, an independent source of potential having the proper magnitude and phase relationship. The introduction of the bank signal into the automatic pilot causes the craft to assume and maintain a banked condition at an angle determined by the magnitude of the bank signal. When the bank signal is terminated, the craft, under action of gyro 40, assumes a level attitude.

The automatic pilot system, generally described above, therefore, is adapted for automatically controlling the various craft surfaces in accordance with a predetermined course and attitude. The automatic pilot, moreover, controls the craft in azimuth and attitude in conformance with signal pre-selected by the human pilot through the manual turn control unit. However, for range flying and automatic approach and landing control the automatic pilot system is also made responsive to radio beams from a ground station.

The automatic approach control system, as more fully described and claimed in aforementioned pending application Serial No. 705,524, and now U. S. Patent No. 2,592,173, is designed to operate with conventional localizer and glide path transmitters located at an airport to which the aircraft is heading. The localizer transmitter is generally located at the far end of the runway and radiates a radio pattern consisting of two overlapping lobes, one of the lobes being modulated at a frequency of A cycles and so arranged as to represent the left hand field of the localizer pattern and the other of the lobes being modulated at a frequency of B cycles so arranged as to represent the right hand field of the localizer pattern, see Figure 11. A line drawn through the center of the overlaps of each pair of lobes defines a localizer beam which is an imaginary straight line down the center of the runway and out into space for some distance. Since the novel orientator 10 hereof functions only with the localizer or flight path computer 11, consideration of glide path computer 53 is unnecessary.

For automatically guiding an aircraft through its automatic pilot system to a landing field in accordance with a localizer beam emanating therefrom, a conventional radio receiver 63, carried by the craft, receives the lateral guidance signals from the localizer transmitter. In a known manner, radio receiver 63 develops at its output a direct current potential, having a given polarity, assuming the craft to be in the radio pattern on one side of the localizer beam, and of an opposite polarity when the craft is in the radio pattern on the opposite side of the localizer beam.

The automatic approach control system is sensitive to the craft direction of displacement from the beam and the length of time that the aircraft is away from the beam axis. The signals developed in the system for operating a craft control surface depend upon the polarity of the radio signal received during the displacement and upon the time of persistence thereof. The time signals, mentioned above, are developed by localizer flight path computer 11 shown in greater detail in Figure 2.

The D. C. output of radio receiver 63 may be fed directly or by way of cross-pointer meter (not shown) to a magnetic inverter-amplifier 64 located within flight path computer 11 by means of leads 65, a fixed contact 66B and armature 66A of relay 66 (Figure 4), located within computer 11, fixed contact 31F and armature 31E of a relay 31, assuming both relays 66 and 31 to be energized at this point, and leads 67. As shown in Figure 2 of the drawings, leads 67 connect with a winding of magnetic inverter-amplifier 64 on which is impressed the radio D. C. signal whereupon a workable alternating current potential, which changes its polarity in response to the relatively weak direct current signal potential supplied to the device, is developed at the output of the magnetic inverter amplifier and applied by means of a lead 68 to the grid 69 of an amplifier tube 70 for further amplification. The output of tube 70 is impressed by means of a lead 71 upon grids 72 and 73 of a discriminator tube 74. Depending upon the polarity of the direct current potential applied to the input of magnetic inverter amplifier 64, the upper or lower plate of tube 74 becomes conductive to pass a signal through either transformer 75 or 76 and the upper or lower plate of a rectifier tube 77, the output of the latter being fed to the upper or lower grid of a dual amplifier tube 78 through a time retarding circuit 79. The potential appearing at one or the other plate of tube 78 builds up to its steady state value in 0.5 second and is impressed through a transformer 80 upon a variable resistor 81 to produce a turn signal potential, which builds up to its steady state value in 0.5 second and whose polarity is dependent upon the particular side of the beam that the aircraft is flying.

A part of the output of transformers 75 and 76 is fed by means of leads 82 to the grids of amplifier tubes 83 and 84, respectively. The output of tubes 83 and 84 unbalance the bridge circuits of thermal relay devices 85 and 86 to impress voltages across potentiometers 87 and 88, respectively. Thermal relay 85 has a time constant whereby the voltage impressed across potentiometer 87 builds up to its steady state value in thirty (30) seconds, while thermal relay 86 has a time constant whereby the voltage impressed across potentiometer 88 builds up to its steady state value in four minutes. The potentials impressed across potentiometers 87 and 88 are fed to the lower and upper grids, respectively, of a dual amplifier tube 89. The output of the lower plate of tube 89 impresses through a transformer 90 a potential across a resistor 91 that gradually builds up to its steady state value in thirty (30) seconds. The output of the upper plate of tube 89, on the other hand, impresses through a transformer 92 a potential across a resistor 93 that gradually builds up to its steady state value in four minutes. The potentials impressed across resistors 91 and 93 are added algebraically to the potential impressed across resistor 81 by means of leads 94 and 95 to develop the turn signal potential necessary to guide the craft through its automatic pilot towards the localizer beam.

As indicated above, the turn displacement signal potential, developed from the radio beam for controlling the craft through its automatic pilot to the beam, is composed of three parts; the first, impressed across resistor 81, builds up to a steady state value in 0.5 second, the second, impressed across resistor 91 builds up to a steady state value in thirty (30) seconds, and the third, impressed across resistor 93 builds up to a steady state value in four (4) minutes. The magnitude of the turn signal potential developed by flight path computer 11 of the automatic approach system depends on the time that is required for the craft to intersect the localizer beam. Thus, the further the craft is from the localizer beam, the greater the resultant displacement signal potential will be for displacing rudder and aileron surfaces. With intersection of the localizer beam by the craft, the direct current potential signal fed into converter 64 drops to zero to cause the potential impressed upon resistor 81 to drop quickly to zero and the potentials across resistors 91 and 93 to gradually decay to zero due to the gradual cooling of the heated bridge arms of thermal relays 85 and 86. Crossing of the localizer beam by the craft changes the polarity of the direct current signal potential fed into magnetic inverter amplifier 64, which reverses the polarity or phase of the alternating current signals impressed upon resistors 81, 91 and 93 to guide the craft back toward the localizer beam.

The directional displacement or compass control of the automatic pilot is connected with the rudder channel of the servo amplifier 29 when the automatic approach control system, generally described above, is engaged to steer the craft through the automatic pilot system. Localizer flight path computer 11 of the approach system is electrically connected to control the automatic pilot when a grounded switch 96 having a segment plate 97 (Figure 4) of the computer unit is moved to a terminal 98, segment 97 connecting terminal 98 with a terminal 99, to energize relays 31, 44 and 66. In this manner, the compass signal reproduced by stator winding 28 of signal transmitter 27 (Figure 1) is algebraically added to the potentials impressed upon resistors 81, 91 and 93 (Figure 2) by means of leads 30 and 35, armatures 31A and 31D and fixed contacts 31G and 31H, respectively, of energized relay 31 and leads 100 and 101 (Figures 2 and 4).

The directional displacement signal of compass 14 and the turn signal or signals developed by flight path computer 11, when algebraically added, are impressed upon the upper and lower grids of an isolator tube 102. The output of the upper plate of tube 102 impresses, through a transformer 103, a potential across a variable resistor 104 which, by means of leads 105 and 106, fixed contacts 66D, 66F and armatures 66C, 66E, respectively, of energized relay 66 and leads 32 and 34, is algebraically added to the potentials developed by rate take-off 33 and rudder follow-up device 16 and fed into the input of the rudder channel of servo amplifier 29 to actuate rudder 13 until the craft has attained a ground track defined by the localizer beam.

The output of the lower plate of tube 102, on the other hand, impresses through a transformer 107 a potential across a variable resistor 108 which, by means of leads 109 and 110 (Figures 2 and 4), fixed contacts 44E, 44F and armatures 44A, 44D, respectively, of energized relay 44 (Figure 4) and leads 43 and 45, is algebraically added to the potentials developed by bank take-off 41 of horizon gyro 40 and aileron follow-up device 50 and fed into the input of the aileron channel of servo amplifier 29 to actuate aileron 48 to produce a coordinated turn while the craft is attaining a ground track defined by the localizer beam.

Coming now to the novel orientator unit 10, constituting the subject matter of the present invention, for automatically guiding the craft, under certain conditions of the desired flight beam, the unit is shown in Figure 3 of the drawings as generally comprising the course setter device 12 which is adapted for developing turn signal potentials that are functions of the craft heading with reference to the localizer beam, a discriminator tube 111 which determines the semi-circle of direction within which craft heading is located, a transformer 112 which supplies alternating current potential for the plates of tube 111, a pair of relays 113 and 114 which are responsive to signals originating from the semi-circle of direction of sector "a" (Figure 10), a pair of relays 115 and 116 which are responsive to signals originating from the semi-circle of direction of sector "b" (Figure 10), a transformer 117 which supplies the alternating current potential for the orientator turn signal, a pair of relays 118 and 119 which are responsive to signals originating from the "c" side of the localizer beam (Figure 11), a pair of relays 120 and 121 which are responsive to signals originating from the "d" side of the beam (Figure 11), a relay 122 whose function is to disconnect flight path computer 11 from the input of the automatic pilot system until the craft intersects the localizer beam and simultaneously to insert signals from discriminator tube 74 (Figure 2) of the computer unit into orientator 10, a relay 123 which applies plate potentials to both discriminator tube 74 of the computer unit and discriminator tube 111 of the orientator unit, a push-button 124 which when actuated engages the orientator unit with the automatic pilot system, a battery 125 which supplies direct current potential for the operation of relays 114, 116, 119, 121, 122 and 123, an amplifier tube 126 which detects the attainment by the craft of an inbound heading parallel to the localizer beam, and a relay 127 which engages the directional displacement or compass control into the automatic pilot in response to the operation of tube 126.

The direction of craft flight relative to the localizer beam is determined by a signal transmitter 128, which may be located within master direction indicator 20 as shown in Figure 1, and course setter 12, the former comprising a three phase stator winding 129 and a single phase rotor winding 130 which is mounted on a shaft 131 for angular displacement by motor 25 whereby a directional displacement signal is developed in the stator windings corresponding to the signal of compass 14, and the latter comprising (Figure 3) a three phase stator winding 132, connected by way of leads 133 with the windings of stator 129 of transmitter 128, and a rotor consisting of two single phase windings 134 and 135 arranged at 90° to each other, the rotor being displaceable angularly relative to its stator by way of a shaft 136 having a manipulative knob 137 thereon which is angularly movable relative to a dial 138 which may be graduated, for example, as a compass card.

With a zero or "N" setting of knob 137 relative to dial 138, the potentials induced within rotor windings 134 and 135 of course setter 12 will be at the maximum and null values, respectively, when the aircraft is flying on a North heading. For proper operation of the orientator, however, where it is to assume control of craft flight, the potentials induced within rotor windings 134 and 135 must be at the maximum and null values, respectively, when the craft has reached and is flying on the heading of the localizer beam. This requirement is accomplished by determining the angle between the heading of the localizer beam and compass North from conventional aeronautical charts. Course setter 12 is, therefore, set to the heading of the localizer beam, prior to engagement of the orientator unit with the automatic pilot, by actuation of knob 137 from its zero or "N" setting in the appropriate direction by an amount corresponding to the angle between the localizer beam and compass North. With the setting of the course setter through knob 137 to the heading of the localizer beam, the potential within rotor winding 134 will drop from a maximum to a null when the heading of the craft is turned from 0° to 90° with the localizer beam, while the potential induced within rotor winding 135 will drop from a maximum to a null when the heading of the craft is turned from 90° to 0° with the localizer beam.

Inasmuch as the directional signal developed by transmitter 128 is impressed upon the windings of stator 132, setting of knob 137 to the heading of the localizer beam displaces rotor windings 134 and 135 relative to the stator whereby signal potentials are induced within the rotor windings which are functions of the heading of the craft with reference to the localizer beam as distinguished from functions of craft heading with reference to compass North. The signal potential developed within rotor winding 134 is impressed by means of leads 139 and 140 upon grids 141 and 142 of discriminator tube 111, the latter having cathodes 143, 144 and plate elements 145, 146. Transformer 112, having a primary winding 147 energized from a suitable source of alternating current, and a grounded center-tapped secondary winding 148, supplies alternating current potential to plate elements 145 and 146. To this end, plate 145 is connected through the operating coil of relay 113 and a lead 149 to a fixed contact 123E of relay 123 while plate 146 is connected through the operating coil of relay 115 and a lead 150 to a fixed contact 123G of relay 123. The respective end terminals of secondary winding 148 of transformer 112, on the other hand, are connected by way of leads 151 and 152 with armatures 123F and 123H of relay 123. As shown in Figure 3, relay 123 consists of fixed contacts 123A, 123C, 123E, 123G and 123I and armatures 123B, 123D, 123F, 123H and 123J. Relay 113, on the other hand, consists of fixed contacts 113A, 113C and movable armatures 113B, 113D while relay 115 consists of fixed contacts 115A, 115C and movable armatures 115B, 115D.

Assuming the craft to be within the radio pattern, subsequent to setting of knob 137, the pilot moves switch 96 to engage terminal 98 whereupon relays 31, 44 and 66 (Figure 4) are energized to engage flight path computer 11 with the input of the automatic pilot and subsequently momentarily depresses pushbutton 124 to engage orientator 10 with the automatic pilot. One terminal of button 124 is grounded, as shown in Figure 3, while the other terminal is connected through the operating coil of relay 123 to the positive terminal of battery 125, so that in response to operation of button 124, relay 123 is energized. Energization of the latter relay causes all of its armatures to engage with their respective fixed contacts whereupon closure of armatures 123F, 123H with contacts 123E, 123G, effects application of potentials to plates 145 and 146 of tube 111.

Discriminator tube 111 is normally biased to cut-off so that with zero signal potential applied to grids 141, 142 thereof (when the craft is on a heading of 90° to the localizer beam) no current will flow through the operating coils of relays 113 and 115. When a signal potential, on the other hand, is impressed upon grids 141, 142 of the tube, the upper or lower plate thereof becomes conductive depending upon the polarity of the impressed signal which, in turn, is determined by the heading of the craft with respect to the localizer beam.

For a better understanding of the present invention, it may be assumed that craft heading is of such a character relative to the beam as to be within the semicircle of direction of sector "a" (Figure 10), so that the signal potential applied to grids 141, 142 of the tube will be of such polarity as to produce a flow of current only through the operating coil of relay 113 whereupon armatures 113B, 113D thereof engage with their related contacts 113A, 113C. Engagement of armature 113B with contact 113A connected with leads 151 and 149, respectively, results in the maintenance of the circuit of plate 145 when relay 123 drops out. Armature 113D, which engages with grounded contact 113C, is connected by way of a lead 154 through the operating coil of relay 114 to positive line 153 so that in response to its engagement with contact 113C relay 114 is energized.

Assuming, on the other hand, that craft heading is within the semi-circle of direction of sector "b" (Figure 10), the signal potential applied to grids 141, 142 of tube 111 will produce a flow of current only through the operating coil of relay 115 to cause armatures 115B, 115D thereof to engage with their related contacts 115A, 115C. Engagement of armature 115B with contact 115A, both of which are connected with leads 150 and 152, respectively, results in the maintenance of the circuit of plate 146 when relay 123 drops out. Armature 115D, which engages with grounded contact 115C, is connected by way of a lead 155 through the operating coil of relay 116 to positive line 153 so that in response to its engagement with contact 115C the latter relay is energized.

An aircraft having a heading within the semi-circle of direction of sector "a" requires a turn in a direction opposite to that of a craft having a heading within the semi-circle of direction of sector "b." To this end, relays 114 and 116, in response to signals produced within rotor winding 134 of course setter 12 by craft headings lying within the semi-circles of direction of sectors "a" and "b," respectively, introduce into the automatic pilot turn signals of proper polarity to cause the craft to assume a heading of 90° with the localizer beam.

Relay 114 consists of fixed contacts 114A, 114C, 114F and 114G and movable armatures 114B, 114D, 114E and 114H while relay 116 consists of fixed contacts 116A, 116C, 116F and 116G and movable armatures 116B, 116D, 116E and 116H. Transformer 117 has a primary winding 156 connected for energization by a suitable source of alternating current and secondary winding 157 which provides the source of turn signal potential introduced into the automatic pilot by the novel orientator unit.

Armatures 114B and 114D of relay 114 are connected with armatures 116D and 116B, respectively, of relay 116 by way of leads 158 and 159. Fixed contacts 114A, 114C of relay 114, on the other hand, connect with fixed contacts 116A, 116C of relay 116 by means of leads 160 and 161. Energization of relay 114, therefore, causes armatures 114B, 114D to engage contacts 114A, 114C thereby impressing a turn signal potential from transformer 117 of a given polarity upon leads 160, 161, respectively, which, as will be pointed out hereinafter, communicate with the input channel of the automatic pilot. By reason of the crossing of leads 158 and 159, the turn signal applied to armatures 114B, 114D of relay 114 will be of opposite polarity to the turn signal applied to armatures 116B, 116D, respectively, of relay 116. Thus, energization of relay 116 will cause armatures 116B, 116D to engage with fixed contacts 116A, 116C to thereby impress a turn signal of opposite polarity upon leads 160 and 161.

Energization of either of relay 114 or 116 effects energization of relay 122 for the reason that fixed contact 123I of relay 123 is connected by means of a lead 162 to one terminal of the operating coil of relay 122 while its related armature 123J is grounded. Fixed contact 114G and armature 114H, on the other hand, of relay 114 are connected with fixed contact 116G and armature 116H, respectively, of relay 116 by way of leads 164 and 163, the former lead connecting with positive line 153 and the latter lead connecting with the other terminal of the operating coil of relay 122. By virtue of the foregoing arrangement, engagement of fixed contact 123I by armature 123J, due to energization of relay 123, to ground one terminal of the operating coil of relay 122, and the engagement of fixed contact 114G by armature 114H or of fixed contact 116G by armature 116H, as determined by the energization of relay 114 or relay 116, to connect the other terminal of the operating coil of relay 122 to positive line 153 results in energization of the latter relay.

Relay 122 consists of fixed contacts 122A, 122C, 122E, 122F, 122H and 122I together with movable armatures 122B, 122D, 122G and 122J, armatures 122D and 122G when relay 122 is de-energized, being in engagement with contacts 122E and 122H. Fixed contact 122A and armature 122B, connected with lead 164 and positive line 153, respectively, act upon engagement to maintain the circuit for the operating coil of relay 122 when either relay 114 or 116 drops out.

Fixed contact 122C of relay 122 is connected by way of a lead 165 to one terminal of the operating coil of relay 118 while armature 122D is connected by means of a lead 166 to the upper plate of discriminator tube 74 of Figure 2. Contact 122E of relay 122, on the other hand, is connected by way of a lead 167 to one terminal of the primary winding of transformer 75 of Figure 2.

Fixed contact 123C of relay 123 is connected by means of a lead 168 to the other terminal of the operating coil of relay 118 while its related armature 123D is connected by way of a lead 169 to the connection point of the opposite terminal of the primary winding of transformer 75 with the secondary winding of a plate supply transformer 170 (Figure 2).

Contact 122F of relay 122 connects by way of a lead 171 with one terminal of the operating coil of relay 120 while related armature 122G connects by way of a lead 172 with the lower plate of discriminator tube 74 of Figure 2. Fixed contact 122H, on the other hand, connects by way of a lead 173 to one terminal of the primary winding of transformer 76 of Figure 2.

Contact 123A of relay 123 connects with the other terminal of the operating coil of relay 120 by way of a lead 174 while related armature 123B is connected by way of a lead 175 to the connection point of the other terminal of the primary winding of transformer 76 with the secondary winding of plate supply transformer 170. Aforementioned relays 118 and 120 consist of fixed contacts 118A, 118C and 120A, 120C together with related movable armatures 118B, 118D and 120B, 120D.

With energization of relay 122, armatures 122D and 122G disengage from contacts 122E and 122H to disconnect transformers 75 and 76 from the plate circuits of discriminator tube 74 and, in cooperation with the engagement of armatures 123D and 123B with fixed contacts 123C and 123A of relay 123, acts to insert into the upper and lower plate circuits of tube 74 the operating coils of relays 118 and 120 in the place of transformers 75 and 76. The foregoing operation, wherein transformers 75 and 76 are disconnected from the plate circuits of tube 74 effectively disconnects and prevents localizer flight path computer 11 from creating and impressing a turn signal for automatic pilot control.

The direction of flight as determined by the side of the localizer beam that the craft is located, is sensed by magnetic-inverter amplifier 64 (Figure 2) and discriminator tube 74 of computer unit 11 of the automatic approach control system. Tube 74 is normally biased to cut-off, so that with zero signal potential applied to grids 72 and 73 (when the aircraft is on the localizer beam) no current flows through the operating coils of relays 118 and 120 which are in the plate circuits of tube 74 as a result of engagement of armatures 122D, 122G, 123D and 123B with contacts 122C, 122F, 123C and 123A, respectively. When a signal potential is impressed upon grids 72 and 73 from the radio receiver output, the upper or lower plate of the tube becomes conductive depending upon the polarity of the direct current signal impressed on magnetic-inverter amplifier 64 which, in turn, is determined by the side of the beam that the craft is located.

Assuming, for example, the craft to be located on the "c" side of the localizer beam (Figure 11), the signal potential applied to grids 72 and 73 is of such polarity that the application of potential to the plates of tube 74 (relays 123 and 122 being energized) provides a flow of current only through the operating coil of relay 118 whereby armatures 118B, 118D engage with contacts 118A, 118C thereof. By engagement of contact 118A with armature 118B, connected to leads 168 and 169, respectively, the circuit of the upper plate of tube 74 is maintained when relay 123 drops out. The remaining contact 118C of relay 118 is grounded and its related armature 118D connects by means of a lead 176 through the operating coil of relay 119 to positive line 153 so that relay 119 is energized in response to engagement of armature 118D with contact 118C.

Assuming, on the other hand, that the aircraft is located on the "d" side of the localizer beam (Figure 11), the signal potential applied to grids 72 and 73 will be of such polarity that the application of potential to the plates of tube 74 (relays 123 and 122 being energized) provides a flow of current only through the operating coil of relay 120 whereby armature 120B, connected with lead 175, engages contact 120A, connected with lead 174, to maintain the circuit of the lower plate of discriminator tube 74 when relay 123 drops out. The remaining contact 120C of relay 120 is grounded and its related armature 120D connects by means of a lead 177 through the operating coil of relay 121 to positive line 153 so that relay 121 is energized in response to engagement of armature 120D with contact 120C.

An aircraft having headings within the semi-circles of direction of sectors "a" and "b" on the "c" side of the localizer beam requires turns in directions opposite to that of a craft having headings within the semi-circles of direction of sectors "a" and "b" on the "d" side of the beam (Figures 13 to 16, inclusive). Turn signals developed for headings within the semi-circles of direction of sectors "a" and "b" on the "c" side of the localizer beam have been established so that no beam location correction is necessary before their insertion into the automatic pilot. Turn signals developed for headings within the semi-circles of direction of sectors "a" and "b" on the "d" side of the localizer beam, on the other hand, are opposite to that of the "c" side of the beam so that beam location correction is necessary for this condition before their insertion into the automatic pilot.

Relays 119 and 121 are effective to apply beam location correction to the turn signals developed by orientator 10 in response to the heading of the craft with reference to the localizer beam. Relay 119 consists of fixed contacts 119A, 119C, 119E and 119G and related armatures 119B, 119D, 119F and 119H while relay 121 consists of fixed contacts 121A, 121C, 121E and 121G and related armatures 121B, 121D, 121F and 121H. Contact 119A of relay 119 and its armature 119B are connected, respectively, by way of leads 178 and 179 to fixed contact 121A and armature 121B of relay 121. Lead 179 is grounded, while lead 178 is connected with lead 162 by way of an intermediate lead 180, so that in response to the engagement of armature 119B with contact 119A of relay 119 or of armature 121B with contact 121A of relay 121 acts to maintain the circuit for the operating coil of relay 122 when relay 123 drops out. Contacts 119C and 119E of relay 119, on the other hand, are connected, respectively, by leads 181 and 182 with fixed contacts 121C and 121E of relay 121. Further, armatures 119D and 119F of relay 119 are connected with armatures 121F and 121D of relay 121 by way of leads 183 and 184, respectively.

The turn signal developed by orientator 10 by way of the transformer 117 (Figure 3), resulting from a given heading of the craft relative to the localizer beam, impressed on leads 160 and 161, when contacts 114A, 114C engage with armatures 114B, 114D of relay 114, is applied to movable armatures 119D and 119F, respectively, of relay 119 by way of leads 185 and 186. Energization of relay 119 in response to signals from the "c" side of the localizer beam, manifested by energization of relay 118, causes armatures 119D and 119F to engage with fixed contacts 119C and 119E, respectively, whereupon the turn signal, without any correction for beam location, is impressed on leads 181 and 182. As a result of the crossing of leads 183 and 184, the turn signal applied to armatures 121D and 121F of relay 121 is opposite in polarity to the turn signal applied to armatures 119D and 119F of relay 119. Operation of relay 121 in response to signals from the "d" side of the localizer beam, as manifested by energization of relay 120, causes armatures 121D and 121F to engage fixed contacts 121C and 121E to impress upon leads 181 and 182, the turn signal corrected for beam location.

The turn signal thus developed by novel orientator 10, and impressed upon leads 181 and 182, is applied by way of leads 187 and 188, respectively, across a variable resistor 189 (Figure 2). As shown in the latter figure, compass signal lead 100 is connected with a sliding contact 190 of resistor 189 whereby the latter resistor is arranged in series with compass signal transmitter 27 and resistors 91, 93 and 81, while the terminal connected to lead 188 is grounded. Hence, the orientator turn signal, applied across resistor 189 is impressed upon the upper and lower grids of isolator tube 102, the output of the latter, in turn, being communicated, through transformer 103 and resistor 104, to the input of the rudder channel of servo amplifier 29 to actuate rudder surface 13 until the craft has assumed a heading of 90° with reference to the localizer beam. The output of the lower plate of tube 102, on the other hand, impresses, through transformer 107 and resistor 108, an aileron deflection signal upon the input aileron channel of servo amplifier 29 to actuate aileron 48 to provide a coordinated turn while the aircraft is maneuvering into a course having a heading of 90° to the localizer beam.

As previously indicated, at the time orientator 10 acts to feed a turn signal into the automatic pilot, it assumes primary control thereof, the compass 14 or directional displacement control as well as the flight path computer 11 being made ineffective by the orientator to control the automatic pilot. The compass reference signal is disconnected from the automatic pilot by the orientator unit whose operation de-energizes a coil 191 (Figure 1) of electromagnetic operated clutch 61 to bring rotor 26 of compass signal transmitter 27 to a null position.

Coil 191 of clutch 61 is grounded by way of a lead 192 (Figure 3), fixed contact 114F of relay 114, which is normally engaged by armature 114E, a lead 193, armature 116E of relay 116, which normally engages with fixed contact 116F, a lead 194, fixed contact 122I of relay 122, armature 122J and a lead 195. Energization of relay 122 causes armature 122J to engage fixed contact 122I to energize clutch coil 191 which condition continues until the craft crosses the localizer beam at which time relay 122 is de-energized by either of relays 119 or 121.

Energization of either relay 114 or 116 by the initial turn of the craft, due to setting of knob 137, causes armatures 114E or 116E to disengage with contacts 114F or 116F whereby clutch coil 191 is de-energized and the directional control is disconnected from the automatic pilot which condition continues until a heading of 90° relative to the localizer beam is assumed by the craft.

As a result of the turn signal introduced into the automatic pilot by the novel orientator unit hereof, the craft turns toward the beam under the control of rate-of-turn gyro 15 at a rate fixed by the amount of the turn signal. With a gradual turning of the craft toward the desired heading, the signal induced within rotor winding 134 of course setter 12 of Figure 3 decreases until the craft attains a course having a heading of 90° relative to the localizer beam when it reaches a null value. As a result, the signal potential of grids 141 and 142 drops to a null and the current flowing in the conductive plate circuit of tube 140 drops to zero to thereby de-energize either combination of relays 113, 114 or 115, 116, depending upon whether plate 145 or 146 had been conductive. The resulting de-energization of either relay 114 or 116 disconnects the turn signal fed by the orientator into the automatic pilot from transformer 117 by the respective disengagement of armatures 114B, 114D from contacts 114A, 114C or of armatures 116B, 116D from contacts 116A, 116C and inserts the directional displacement control from compass 14 into the automatic pilot, through leads 100, 101 and isolator tube 102, by the resulting engagement of armature 114E with contact 114F or of armature 116E with contact 116F.

With the insertion of the direction displacement control into the automatic pilot, craft turn is terminated and the craft is maintained on a course having a heading of 90° relative to the localizer beam as shown in Figure 6. As the beam is intersected by the craft, the direct current signal impressed by radio receiver 63 upon magnetic-inverter amplifier 64 drops to zero, so that a zero signal potential is applied to grids 72 and 73 of tube 74 of Figure 2. The current flowing in the conductive plate circuit of tube 74 drops to zero to de-energize either combination of relays 118, 119 or 120, 121 depending upon whether the upper or lower plate was conductive. De-energization of either relay 119 or 121 causes disengagement of armature 119B with contact 119A or of armature 121B with contact 121A to thereby interrupt the circuit of the operating coil of relay 122. With de-energization of the latter relay, armatures 122D, 122G disengage from contacts 122C, 122F and engage with fixed contacts 122E, 122H to disconnect relays 118 and 120 from the circuit of tube 74 and to insert transformers 75 and 76 into the upper and lower plate circuits of the tube and, at the same time, disengagement of armature 122J from contact 122I de-energizes clutch coil 191 to disconnect the directional displacement control from the automatic pilot.

As the craft crosses over to the other side of the localizer beam (Figure 8), localizer flight path computer 11 of the automatic approach control system begins to operate. At this point, turn signal producing devices such as magnetic-inverter amplifier 64, thermal relays 85 and 86 begin to function to create turn signals which are impressed upon the upper and lower grids of tube 102. The output of the upper plate of tube 102 impresses, through transformer 103 and resistor 104, a turn signal upon the input of the rudder channel of servo amplifier 29 to actuate rudder 13 until the craft has acquired a course having an inbound heading parallel with the localizer beam. The output of the lower plate of tube 102 impresses, through transformer 107 and resistor 108, a signal upon the input of the aileron channel of servo amplifier 29 to actuate aileron 48 to provide a coordinated turn while the craft is maneuvering to a course having an inbound heading parallel to the localizer beam.

The signal potential developed within rotor winding 135 of course setter 12, being at a maximum when the signal of rotor winding 134 is zero and dropping to zero when an inbound heading parallel to the localizer beam has been attained, is fed by means of a lead 196 upon a grid 197 of amplifier tube 126, the latter also being provided with a cathode 198 and a plate 199. The latter plate is connected through the operating coil of relay 127 and a lead 200 to armature 119H of relay 119 and armature 121H of relay 121, the latter armatures being interconnected by way of a lead 201. Related armature contacts 119G and 121G are interconnected by way of a lead 202 and connect by way of a lead 203 to the positive terminal of a battery 204 whose negative terminal is grounded. Aforementioned relay 127 comprises fixed contacts 127A, 127D and related armatures 127B, 127C, the latter normally engaging contact 127D.

Tube 126 is normally biased to cut off so that with zero signal potential applied to grid 197 (when the craft is on a heading parallel to the localizer beam) no current will flow through the operating coil of relay 127. When a signal potential is impressed upon grid 197, plate 199 becomes conductive, when either contact 119G of relay 119 is engaged by its armature 119H or when contact 121G is engaged by its armature 121H, to thus apply the potential of battery 204 to plate 199 to thereby provide a flow of current through the operating coil of relay 127 causing armature 127B to engage with its contact 127A and armature 127C to disengage from its contact 127D. Relay contact 127A and armature 127B, connected to leads 200 and 202, respectively, act on engagement to maintain the circuit of plate 199 when either relay 119 or 121 is de-energized. Relay armature 127C and contact 127D, on the other hand, are connected by way of leads 205 and 206 to armature 122J and contact 122I of relay 122.

When the craft acquires a course having an inbound heading parallel to the localizer beam, the signal potential induced within winding 135 of course setter 12 and impressed upon grid 197 of tube 126 drops to a null so that no current flows through the operating coil of relay 127 causing de-energization of the latter whereby armature 127C engages contact 127D to ground clutch coil 191 to thereby re-instate the directional control from compass signal transmitter 27. The compass or directional displacement control signal is introduced into flight path computer 11 of the automatic approach control system and added algebraically to the turn signals impressed upon resistors 91, 93 and 81. With the last engagement of the directional displacement control, orientator 10 is completely de-energized and is thus automatically disengaged from the automatic pilot and control of the latter is taken over by the automatic approach control system to bring the craft onto the localizer beam.

If the craft fails to intersect the localizer beam at a heading of 90° thereto, orientator 10 will still function but the procedure will be shortened. The turn to the 90° heading relative to the localizer beam is terminated by the interception of the beam. Upon interception of the localizer beam, relays 119 or 121 are de-energized depending on whether the upper or lower plate of tube 74 was conductive to terminate the orientator turn signal by the respective disengagement of armatures 119D and 119F from fixed contacts 119C and 119E or of armatures 121D and 121F from fixed contacts 121C and 121E. When the craft crosses over to the other side of the localizer beam, localizer flight path computer 11 of the automatic approach control system begins to function to bring the craft onto an inbound heading parallel to the localizer beam.

Although but a single embodiment of the invention has been illustrated and described, various changes and modifications in the form and relative arrangement of the parts, which will now appear to those skilled in the art, may be made without departing from the scope of the invention.

We claim:

1. Apparatus for automatically steering an aircraft toward a directional radio beam when the aircraft is within the radio pattern but is displaced a substantial distance from the beam, the aircraft being provided with an automatic pilot and with an automatic approach control system for controlling craft flight along the beam through the automatic pilot, comprising means for rendering ineffective control of the automatic pilot by the automatic approach system, and means responsive to said first means for developing a signal for assuming primary control of the automatic pilot to turn the aircraft toward the beam.

2. Apparatus for automatically steering an aircraft toward a directional radio beam when the aircraft is within the radio pattern but is displaced a substantial distance from the beam, the aircraft being provided with an automatic pilot and with an automatic approach control system for controlling craft flight along the beam through the automatic pilot, comprising means for rendering ineffective control of the automatic pilot by the automatic approach system, and means including a course setter mechanism for developing a signal for assuming primary control of the automatic pilot to turn the aircraft toward the beam.

3. Apparatus for automatically steering an aircraft toward a directional radio beam when the aircraft is within the radio pattern but is displaced a substantial distance from the beam, the aircraft being provided with an automatic pilot and with an automatic approach control system for controlling craft flight along the beam through the automatic pilot, comprising means for rendering ineffective control of the automatic pilot by the automatic approach system, means for developing a turn signal for assuming primary control of the automatic pilot, and means including a course setter mechanism for operating said last-named means to turn the aircraft toward the beam.

4. Apparatus for automatically steering an aircraft toward a directional radio beam when the aircraft is within the radio pattern but is displaced a substantial distance from the beam, the aircraft being provided with an automatic pilot and with an automatic approach control system for controlling craft flight along the beam through the automatic pilot, comprising means for rendering ineffective control of the automatic pilot by the automatic approach system, means for developing a turn signal of predetermined polarity from an independent source of current for assuming primary control of the automatic pilot to turn the aircraft, and means including course setter means energized by said first-named means for operating said signal means to turn the aircraft in a direction toward the beam.

5. Apparatus for automatically steering an aircraft toward a directional radio beam when the aircraft is within the radio pattern but is displaced a substantial distance from the beam, the aircraft being provided with an automatic pilot and with an automatic approach system including a flight path computer for controlling craft flight along the beam through the automatic pilot, comprising means for rendering ineffective control of the automatic pilot by the computer, means for developing a turn signal for assuming primary control of the automatic pilot, and means including a course setter mechanism energized by said first-named means for operating said signal means in accordance with heading of the craft relative to the beam to turn the craft toward the beam.

6. Apparatus for automatically steering an aircraft toward a directional radio beam when the aircraft is within the radio pattern but is displaced a substantial distance from the beam, the aircraft having movable control surfaces thereon and being provided with an automatic radio approach control system for controlling the surfaces to fly the craft along the beam, comprising means for rendering ineffective control of the surfaces by the automatic approach system, and means energized by said first named means for developing a signal corresponding to the position and heading of the aircraft relative to the beam for assuming primary control of the surfaces to turn the aircraft toward the beam.

7. Apparatus for automatically steering an aircraft toward a directional radio beam when the aircraft is within the radio pattern but is displaced a substantial distance from the beam, the aircraft having movable control surfaces thereon and being provided with an automatic radio approach control system for controlling the surfaces to fly the craft along the beam, comprising means for rendering ineffective control of the surfaces by the automatic approach system, means energized by said first named means for developing a signal corresponding to heading of the craft for assuming primary control of the surfaces, and means operative in response to the side of the beam on which the aircraft is flying to determine the polarity of the signal to turn the aircraft toward the beam.

8. Apparatus for automatically steering an aircraft toward a directional radio beam when the aircraft is within the radio pattern but is displaced a substantial distance from the beam, the aircraft having a movable control surface thereon and being provided with an automatic radio approach control system for controlling the surface to fly the craft along the beam, comprising means for rendering ineffective control of the surface by the automatic approach system, an independent source of current, and means including course setter means energized by said first named means for developing a signal from said source for assuming primary control of the surface to turn the aircraft toward the beam.

9. Orientation apparatus for automatically steering an aircraft toward a directional radio beam when the aircraft is within the radio pattern but is displaced a substantal distance from the beam, the aircraft being provided with an automatic pilot and with an automatic approach control system for controlling craft flight along the beam through the automatic pilot, comprising means for renderng ineffecive control of the automatic pilot by the automatic approach system, and means including a course setter mechanism energized by said first named means for developing a signal for assuming primary control of the automatic pilot to turn the aircraft toward the beam, and means connected with said mechanism and operative when the aircraft attains a predetermined heading relative to the beam to discontinue the turn signal.

10. Orientation apparatus for automatically steering an aircraft toward a directional radio beam when the aircraft is within the radio pattern but is displaced a substantial distance from the beam, the aircraft being provided with an automatic pilot having a fixed base line for controlling the automatic pilot and an automatic approach control system for flying the craft along the beam, comprising means for rendering ineffective control of the automatic pilot by the automatic approach system, and means including a course setter mechanism for rendering ineffective control of the automatic pilot by the base line and for developing a signal assuming primary control of the automatic pilot to turn the aircraft toward the beam.

11. Apparatus for automatically steering an aircraft toward a directional radio beam when the aircraft is located within the radio pattern but is displaced a substantial distance from the beam, the aircraft having movable rudder and aileron surfaces and being provided with an automatic approach control system controlling the rudder and aileron surfaces to maintain craft flight along the beam, comprising means for rendering ineffective control of the rudder and aileron surfaces by the automatic approach control system, and means energized by said last-named means and operative to develop a signal corresponding to heading and position of the aircraft relative to the beam for assuming primary control of the rudder and aileron surfaces to turn the aircraft toward the beam.

12. Orientation apparatus for automatically steering an aircraft toward a directional radio beam when the aircraft is within the radio pattern but is displaced a substantial distance from the beam, the aircraft being provided with an automatic pilot having a fixed base line for control of the pilot and an automatic approach control system for controlling craft flight along the beam through the automatic pilot, comprising means for rendering ineffective control of the automatic pilot by the automatic approach system, means including a course setter mechanism for rendering ineffective control of the automatic pilot by the base line and for developing a signal for assuming primary control of the automatic pilot to turn the aircraft toward the beam, and means connected with said mechanism and operative when the aircraft attains a predetermined heading relative to the beam to render the automatic pilot unresponsive to the turn signal and responsive to the base line.

13. Orientation apparatus for automatically steering an aircraft toward a directional radio beam when the aircraft is within the radio pattern but is displaced a substantial distance from the beam, the aircraft being provided with an automatic pilot having a fixed base line for controlling the automatic pilot, an automatic approach control system for controlling craft flight along the beam through the automatic pilot, comprising means for rendering ineffective control of the automatic pilot by the automatic approach system, means including a course setter mechanism for rendering ineffective control of the automatic pilot by the base line and for developing a signal for assuming primary control of the automatic pilot to turn the aircraft to assume a ninety degree heading relative to the beam, and means connected with said mechanism and operative when the aircraft attains said ninety degree heading relative to the beam to discontinue said turn signal and to render the automatic pilot responsive to the base line to maintain the aircraft on said last-named heading.

14. A system for controlling the flight of an aircraft so as to approach and coincide with a beam comprising a receiver for the reception of radiant energy transmitted from a stationary beam-defining transmitter, a reference signal computer which receives the output of said receiver, aircraft control means, a plurality of gyroscopic orientation devices carried on said aircraft, a plurality of signals from said gyroscopic orientation devices furnished to said reference signal computer, a steering signal computer furnished the output of the reference signal computer, and the output of said steering signal computer fed to said aircraft control means.

15. Orientation apparatus for automatically steering an aircraft toward a directional radio beam when the aircraft is within the radio pattern but is displaced a substantial distance from the beam, the aircraft being provided with an automatic pilot having a fixed base line for the normal control thereof and an automatic approach control system for controlling craft flight along the beam through the automatic pilot, comprising means for rendering ineffective control of the automatic pilot by the automatic approach system, means including a course setter mechanism for developing a signal for assuming primary control of and for disconnecting the base line from the automatic pilot to turn the aircraft toward the beam, means connected with said mechanism and operative when the aircraft attains a predetermined heading relative to the beam to discontinue said turn signal and to re-connect the base line with the automatic pilot to maintain the aircraft on said last-named heading to cross the beam, and means operative in response to the crossing of the beam by said aircraft for disconnecting the base line from the automatic pilot and for making said automatic approach control system effective to control said automatic pilot.

16. Automatic orientation apparatus for steering an aircraft toward a directional radio beam when the aircraft is within the radio pattern but is displaced a substantial distance from the beam, the aircraft being provided with an automatic pilot having a fixed base line for the normal control thereof and an automatic approach control system for controlling craft flight along the beam through the automatic pilot, comprising means for rendering ineffective control of the automatic pilot by the automatic approach system, means including a course setter mechanism for developing a signal for assuming primary control of and for disconnecting the base line from the automatic pilot to turn the aircraft toward the beam, means connected with said mechanism and operative when the aircraft attains a predetermined heading relative to the beam to discontinue said turn signal and to re-connect the base line with the automatic pilot to maintain the aircraft on said last-named heading to cross the beam, means operative in response to the crossing of the beam by said aircraft for disconnecting the base line from the automatic pilot and for making said automatic approach control system effective to control said automatic pilot to bring the aircraft on to an inbound heading relative to the beam, and means operative in response to the attainment of the inbound heading by said aircraft relative to the beam to re-connect said base line with said automatic pilot.

17. Automatic orientation apparatus for steering an aircraft toward a directional radio beam when the aircraft is within the radio pattern but is displaced a substantial distance from the beam, the aircraft being provided with an automatic pilot having a fixed base line for the normal control thereof and an automatic approach control system for controlling craft flight along the beam through the automatic pilot, comprising means for energizing said apparatus and for rendering ineffective control of the automatic pilot by the automatic approach system, means including a course setter mechanism for developing a signal for assuming primary control of and for disconnecting the base line from the automatic pilot to turn the aircraft toward the beam, means connected with said mechanism and operative when the aircraft attains a predetermined heading relative to the beam to discontinue said turn signal and to re-connect the base line with the automatic pilot to maintain the aircraft on said last-named heading to cross the beam, means operative in response to the crossing of the beam by said aircraft for disconnecting the base line from the automatic pilot and for making said automatic approach control system effective to control said automatic pilot to bring the aircraft on to an inbound heading relative to the beam, and means operative in response to the attainment of the inbound heading by said aircraft relative to the beam to re-connect said base line with said automatic pilot and for de-energizing said apparatus.

18. Automatic orientation apparatus for steering an aircraft toward a directional radio beam when the aircraft is within the radio pattern but is displaced a substantial distance from the beam, the aircraft being provided with movable control surfaces thereon and a fixed base line for the normal control thereof together with an automatic approach control system for controlling craft flight along said beam, comprising means for energizing said apparatus and for rendering ineffective control of said surfaces by the automatic approach system, means including a course setter mechanism for developing a signal for assuming primary control of and for disconnecting the base line from said surfaces to turn the aircraft toward the beam, means connected with said mechanism and operative when the aircraft attains a predetermined heading relative to the beam to discontinue said turn signal and to re-connect the base line with said surfaces to maintain the aircraft on said last-named heading to cross the beam, means operative in response to the crossing of the beam by said aircraft for disconnecting the base line from said surfaces and for making said automatic approach control system effective to control said surfaces to bring the aircraft on to an inbound heading relative to the beam, and means operative in response to the attainment of the inbound heading by said aircraft to re-connect said base line with said surfaces and for de-energizing said apparatus.

19. An orientator unit for automatically steering an aircraft toward a directional radio beam when the aircraft is within the radio pattern but is displaced a substantial distance from the beam, comprising means including a course setter mechanism for developing a signal to turn the aircraft toward the beam, means connected with said mechanism and operative when the aircraft attains a heading substantially normal to the beam to discontinue said turn signal, and means for heading the aircraft in a direction substantially normal to the beam effective when the signal is discontinued.

20. An orientator unit for automatically steering an aircraft toward a directional radio beam when the aircraft is within the radio pattern but is displaced a substantial distance from the beam, comprising means for developing a signal for controlling the aircraft to turn toward the beam, a course setter for energizing said signal developing means, means connected with said course setter and operative when the aircraft attains a heading substantially normal to the beam for de-energizing said signal developing means, and means for heading the aircraft in a direction substantially normal to the beam effective when said signal developing means is de-energized.

21. An orientator unit for automatically steering an aircraft toward a directional radio beam when the aircraft is within the radio pattern but is displaced a substantial distance from the beam, comprising means for developing a reversible signal for controlling the aircraft to turn toward the beam by the shortest path whether the aircraft is located on one side or the other of said beam, a course setter for energizing said signal developing means, means connected with said course setter and operative when the aircraft attains a heading substantially normal to the beam for de-energizing said signal developing means, and means for heading the aircraft in a direction substantially normal to the beam effective when said signal developing means is de-energized.

22. An orientator unit for automatically steering an aircraft toward a directional radio beam when the aircraft is within the radio pattern but is displaced a substantial distance from the beam, comprising means for developing a signal to turn the craft toward the beam until it assumes a heading substantially normal to the beam, a course setter device for energizing said signal developing means, means for setting said device to the heading of the beam, means responsive to said device for discontinuing the turn when the craft attains a heading substantially normal to the beam, and means for heading the craft in a direction substantially normal to the beam effective when the turn is discontinued.

23. An orientator unit for automatically steering an aircraft toward a directional radio beam when the aircraft is within the radio pattern but is displaced a substantial distance from the beam, comprising a signal source, means for developing a signal from said source to turn the craft toward the beam until it assumes a heading substantially normal to the beam, a course setter device for energizing said signal developing means, means for setting said device to the heading of said beam, means responsive to said device for discontinuing the turn when the craft attains a heading substantially normal to the beam, and means for heading the craft in a direction substantially normal to the beam effective when the turn is discontinued.

24. An orientator unit for automatically steering an aircraft toward a directional radio beam when the aircraft is within the radio pattern but is displaced a substantial distance from the beam, comprising means for developing a signal for controlling the aircraft to turn toward the beam until it assumes a heading substantially normal to the beam, a course setter device for energizing said signal developing means, means for setting said device to the heading of said beam, means connected with said device and operative when the aircraft attains a heading substantially normal to the beam for de-energizing said signal developing means, and means for heading the craft in a direction substantially normal to the beam effective when said signal developing means is de-energized.

25. An orientator unit for automatically steering an aircraft toward a directional radio beam when the aircraft is within the radio pattern but is displaced a substantial distance from the beam, comprising a discriminator tube having two conductive portions for developing a signal of one polarity when one of its portions is conductive and a signal of another polarity when the other of its portions is conductive for controlling the aircraft to turn toward the beam until it assumes a heading substantially normal to the beam, an angularly displaceable inductive device operative when displaced in one direction to develop a signal of one polarity to energize one of the portions of said tube and when displaced in an opposite direction to develop a signal of another polarity to energize the other portion of said tube, and means for setting said device to the heading of said beam whereby the signal of said tube will be discontinued when the craft attains a heading normal to the beam.

26. An orientator unit for automatically steering an aircraft toward a directional radio beam when the aircraft is within the radio pattern but is displaced a substantial distance from the beam, comprising a discriminator tube having two conductive portions for developing a signal of one polarity when one of its portions is conductive and a signal of another polarity when the other of its portions is conductive for controlling the aircraft to turn toward the beam until it assumes a heading substantially normal to the beam, and an angularly displaceable inductive device operative when displaced in one direction to develop a signal of one polarity to energize one of the portions of said tube and when displaced in an opposite direction to develop a signal of another polarity to energize the other portion of said tube, the signals of said inductive device dropping to zero when the aircraft attains a heading substantially normal to the beam to de-energize said tube and to terminate the aircraft turn.

27. An orientator unit for automatically steering an aircraft toward a directional radio beam when the aircraft is within the radio pattern but is displaced a substantial distance from the beam, said aircraft being provided with movable control surfaces thereon and a fixed base line for normally controlling the operation of said surfaces, comprising a discriminator device having two conductive portions for developing a signal of one polarity when one of its portions is conductive and a signal of another polarity when the other of its portions is conductive for controlling the aircraft to turn toward the beam until it assumes a heading substantially normal to the beam, means energized by said device to disconnect said base line from said surfaces and to connect said device to control the operation of said surfaces, and an angularly displaceable course setter operative when displaced in one direction to develop a signal of one polarity to energize one of the portions of said device and when displaced in an opposite direction to develop a signal of an opposite polarity to energize the other portion of said device whereby the signal of said device will be discontinued when the craft attains a heading normal to the beam.

28. An orientator unit for automatically steering an aircraft toward a directional radio beam when the aircraft is within the radio pattern but is displaced a substantial distance from the beam, said aircraft being provided with an automatic pilot thereon together with a fixed base line for normally controlling craft flight through said automatic pilot, comprising a discriminator device having two conductive portions for developing a signal of one polarity when one of its portions is conductive and a signal of another polarity when the other of its portions is conductive for controlling the aircraft to turn toward the beam until it assumes a heading substantially normal to the beam, means energized by said device to disconnect said base line from said automatic pilot and to connect said device to control said automatic pilot, an angularly displaceable inductive course setter operative when displaced in one direction to develop a signal of one polarity to energize one of the portions of said device and when displaced in an opposite direction to develop a signal of an opposite polarity to energize the other portion of said device whereby the signal of said device will be discontinued when the craft attains a heading normal to the beam, and means for displacing said course setter in one direction when the aircraft is located on one side of said beam and in an opposite direction when the aircraft is located on the other side of said beam.

29. An orientator unit for automatically steering an aircraft toward a directional radio beam when the aircraft is within the radio pattern but is displaced a substantial distance from the beam, said aircraft being provided with an automatic pilot thereon together with a fixed base line for normally controlling craft flight through said automatic pilot, comprising a discriminator device having two conductive portions for developing a signal of one polarity when one of its portions is conductive and a signal of another polarity when the other of its portions is conductive for controlling the aircraft to turn toward the beam until it assumes a heading substantially normal to the beam, means energized by said device to disconnect said base line from said automatic pilot and to connect said device to control said automatic pilot, and an angularly displaceable inductive course setter operative when displaced in one direction to develop a signal of one polarity to energize one of the portions of said device and when displaced in an opposite direction to develop a signal of an opposite polarity to energize the other portion of said device, the signals of said course setter dropping to zero when the aircraft attains a heading substantially normal to the beam to de-energize said device and said first-named means whereupon the latter disconnects said device from said automatic pilot and re-connects said base line to said automatic pilot.

30. Navigation system for automatically steering an aircraft toward a directional radio beam when the aircraft is within the radio pattern but is displaced a substantial distance from the beam, said aircraft being provided with an automatic pilot thereon having a fixed base line therefor together with radio apparatus for normally controlling the operation of the automatic pilot in conjunction with said base line to maintain craft flight on said beam, comprising means for disconnecting said radio apparatus and said base line from said pilot and for assuming primary control of said automatic pilot to turn said aircraft to a heading of ninety degrees relative to said beam, means operative in response to the attainment of the aircraft of said last-named heading to terminate said turn signal and to re-connect said base line to said automatic pilot to steer said aircraft to cross said beam, means operative in response to the crossing of said beam by said aircraft to disconnect said base line from said automatic pilot and to connect said radio apparatus to said automatic pilot to automatically bring said aircraft on to an inbound heading relative to said beam, and means operative when said aircraft attains said last-named heading to re-connect said base line to said automatic pilot.

31. An orientator unit for automatically steering an aircraft provided with movable control surfaces thereon toward a predetermined reference, comprising a displaceable course setter for developing a control signal corresponding to the heading of said reference relative to magnetic North, means for developing a turn signal for controlling operation of said surfaces to turn the aircraft toward said reference to cause said craft to assume a heading normal to said reference, discriminator means interconnecting said course setter and said last-named means to provide signals corresponding to the position and heading of the aircraft relative to the reference, and means operative when the aircraft has assumed a heading substantially normal to the reference to maintain the aircraft in said heading.

32. An orientator unit for automatically steering an aircraft provided with movable control surfaces thereon toward a predetermined reference, comprising a displaceable inductive course setter for developing a control signal corresponding to the heading of said reference relative to magnetic North, means for developing a turn signal for controlling operation of said surfaces to turn the aircraft toward said reference to cause said craft to assume a heading normal to said reference, discriminator means interconnecting said course setter and said last-named means to provide a signal corresponding to the position and heading of the aircraft relative to the reference, means for displacing said course setter in conformance with the side of said reference that the aircraft is located, and means operative when the aircraft has assumed a heading substantially normal to the reference to maintain the aircraft in said heading.

33. An orientator unit for automatically steering an aircraft toward a predetermined reference, said aircraft being provided with movable control surfaces thereon together with a fixed base line for normally controlling operation of said surfaces when said craft is in a predetermined position relative to said reference, comprising a manually displaceable course setter mechanism for disconnecting said base line from said surfaces when said craft is in a position other than said predetermined position relative to said reference and for developing a control signal to actuate said surfaces to turn said aircraft to a ninety degree heading relative to said reference, and means operative when said aircraft has reached said heading to terminate said control signal and means operative upon termination of the signal to re-connect said base line to control said surfaces to maintain said aircraft on said heading to cross said reference.

References Cited in the file of this patent
UNITED STATES PATENTS

| | | |
|---|---|---|
| 1,896,805 | Sperry et al. | Feb. 7, 1933 |
| 2,266,410 | Busignies | Dec. 16, 1941 |
| 2,416,097 | Hansen et al. | Feb. 18, 1947 |
| 2,423,337 | Moseley | July 1, 1947 |
| 2,472,129 | Streeter | June 7, 1949 |

OTHER REFERENCES

"Electronics" of October 1944, pages 110–117, inclusive.